United States Patent [19]
Barron et al.

[11] Patent Number: 5,466,163
[45] Date of Patent: Nov. 14, 1995

[54] UMBILICAL MECHANISM

[75] Inventors: Daniel R. Barron, Huntington Beach; Vytas Jasulaitis, Los Angeles; Brion F. Morrill, Huntington Beach, all of Calif.

[73] Assignee: McDonnell Douglas Corporation, Huntington Beach, Calif.

[21] Appl. No.: 223,650

[22] Filed: Apr. 6, 1994

[51] Int. Cl.$^6$ .................................................. H01R 13/44
[52] U.S. Cl. ............................................................ 439/138
[58] Field of Search .................................... 439/138, 131, 439/135, 140; 244/161; 89/1.811

[56] References Cited

U.S. PATENT DOCUMENTS

| | | | |
|---|---|---|---|
| 2,944,631 | 7/1960 | Kerry | 55/306 |
| 3,098,132 | 7/1963 | Blomquist | 200/50 A |
| 3,120,784 | 2/1964 | Magers | 89/1.811 |
| 4,176,897 | 12/1979 | Cameron | 439/138 |
| 4,217,019 | 8/1980 | Cameron | 439/138 |
| 4,345,808 | 8/1982 | Ingham | 439/138 |
| 4,898,348 | 2/1990 | Kahn | 244/161 |
| 5,174,772 | 12/1992 | Vranish | 439/131 |

FOREIGN PATENT DOCUMENTS

| 2059081 | 6/1971 | Germany | 439/138 |
|---|---|---|---|
| 161683 | 6/1989 | Japan | 439/138 |

*Primary Examiner*—William Briggs
*Attorney, Agent, or Firm*—Freilich, Hornbaker & Rosen

[57] ABSTRACT

Apparatus is described for automatically mating a pair of connectors and protecting them prior to mating, which minimizes weight and uses relatively simple and reliable mechanisms. Lower and upper connectors (24, 26) are held in lower and upper parts (14, 16) of a housing, with the upper connector mounted on a carrier (32) that is motor driven to move down and mate the connectors. A pair of movable members (36, 38) serve as shields, as coarse alignment aids, and as force transmitters. The movable members are pivotally mounted at the bottom of the upper housing, and as the carrier moves down it pivots the members out of the way. The movable members have socket elements (116) that closely receive pin elements (120) on the lower housing part, to coarsely align the connectors and to react mating and unmating forces between the housings. The carrier has a pair of plate portions (60, 62) with slots (64), and the movable members have cam followers engaged with the slot walls, to move the members with precision. The carrier plate-like portions engage follower members (82) that pivot open lower shield parts (44, 46) covering the lower connector, which is mounted on four stacks of Belleville washers (142).

10 Claims, 3 Drawing Sheets

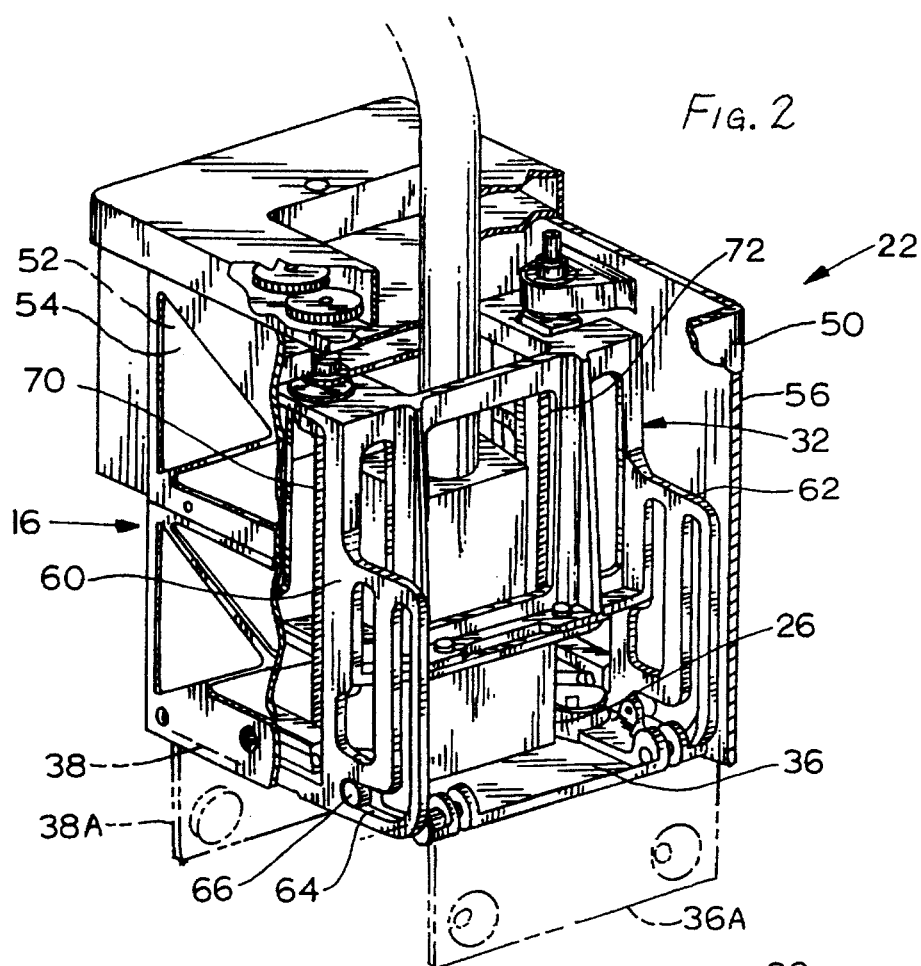
Fig. 2
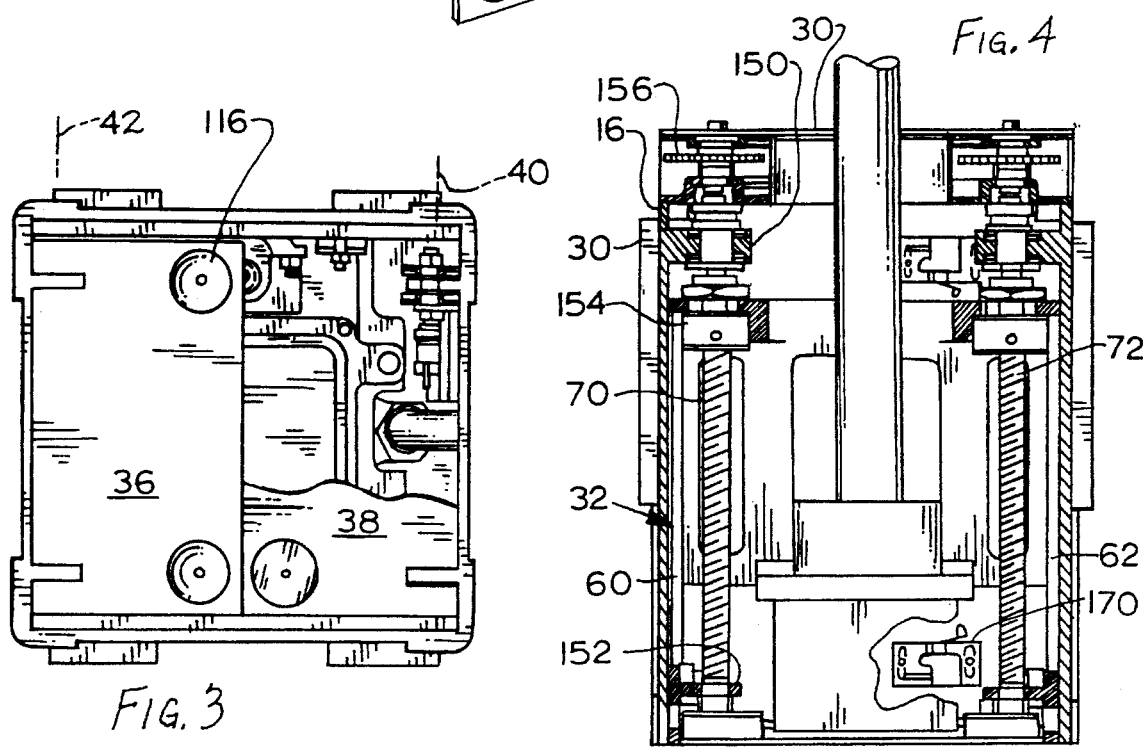
Fig. 3
Fig. 4

5,466,163

1
UMBILICAL MECHANISM

ORIGIN OF THE INVENTION

The invention described herein was made in the performance of work under NASA Contract No. NAS 9-18200 and is subject to the provisions of section 305 of the National Aeronautics Space Act of 1958 (42 USC 2457).

BACKGROUND OF THE INVENTION

Mechanisms are required to mate and unmate (especially where repetitive mating and Unmating is required) electrical and fluid connectors in hazardous or very remote environments, principally in space stations, but potentially also in nuclear reactor, toxic chemical, and undersea environments. Such mechanism may require shields to protect the mating faces of the connectors when they are unmated and to move the shields out of the way during mating. As the connectors are mated or unmated, it is desirable to provide a force-transmitting structure to transmit the forces between the connectors. It would be desirable if the mechanism for moving the connectors and shields were highly reliable yet as simple as possible, and if a lightweight structure for transmitting forces between connectors were as lightweight as possible.

SUMMARY OF THE INVENTION

In accordance with one embodiment of the present invention, apparatus is provided for automatically mating a pair of connectors, which is of relatively light weight and high reliability. A lower connector lies within a lower housing part while an upper connector lies on a movable carrier in an upper housing part. A motor-driven mechanism moves down the carrier to mate the connectors. As the carrier moves down, it pivots down a pair of movable members at the lower end of the upper housing, to move them out of the way of the carrier. As the members pivot down, socket and pin elements respectively on the movable members and on the lower housing engage. Mating and demating forces are transmitted through the elements and the movable members, which avoids the need for an additional rigid connecting structure.

The movable members not only transmit mating and demating forces, but also provide coarse alignment of the connectors, and serve as shields to protect the upper connector prior to mating. A pair of lower shield parts shield the lower connector prior to mating. The lower connector is resiliently mounted on spring devices, so the lower connector can shift sidewardly and tilt slightly to align the connectors as they mate. The spring devices are formed by stacks of Belleville washers that support the lower connector while allowing for such shift and tilt.

The novel features of the invention are set forth with particularity in the appended claims. The invention will be best understood from the following description when read in conjunction with the accompanying drawings.

BRIEF DESCRIPTION OF THE DRAWINGS

FIG. 2 is a partially sectional isometric view of the upper unit of the apparatus of FIG. 1.

2

FIG. 3 is a partially sectional bottom view of the upper unit of FIG. 2.

FIG. 4 is a sectional side view of the upper unit of FIG. 2.

Figure 1:
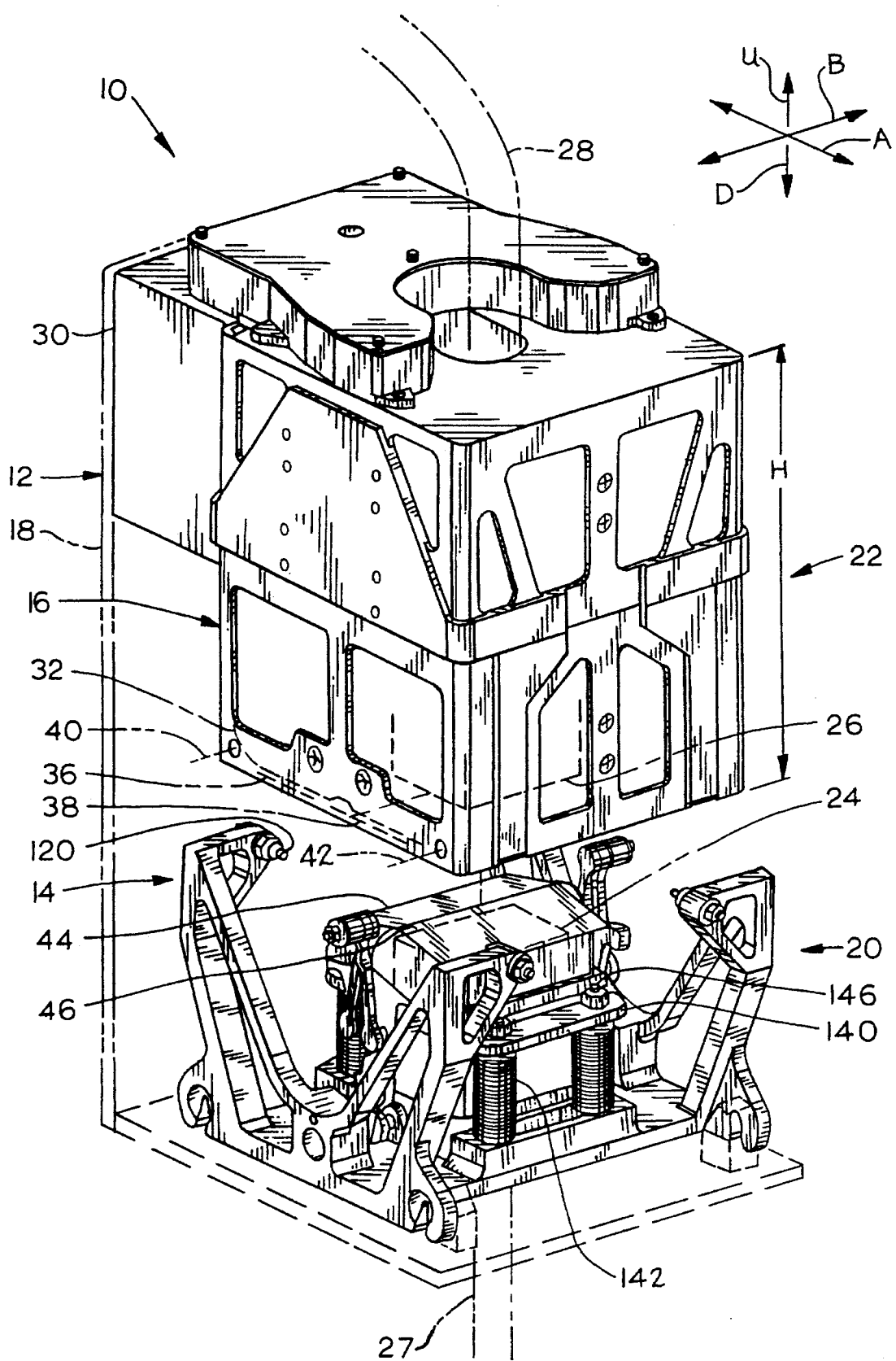
FIG. 1 is an isometric view of connecting apparatus constructed in accordance with the present invention, with the upper and lower connectors being shown in their initial or fully unmated positions.
Figure 5:
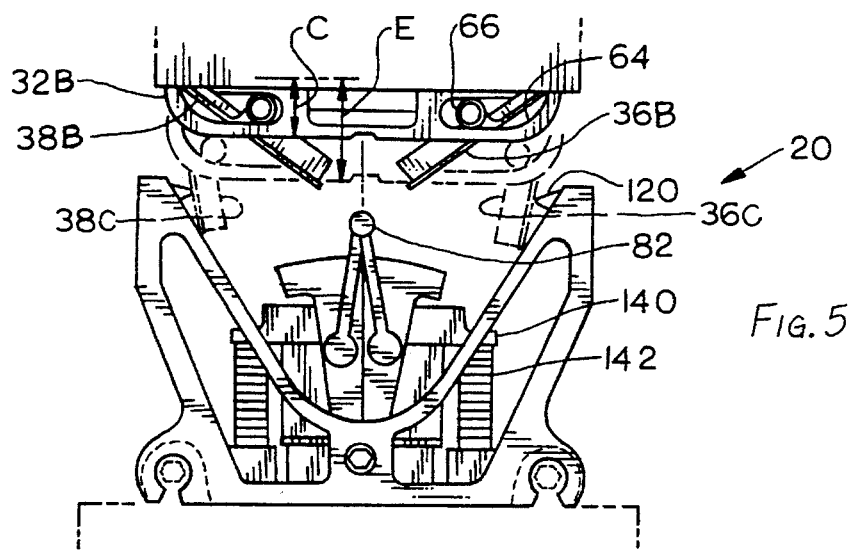

FIG. 5 is a side elevation view of the apparatus of FIG. 1, during an early stage of a connection.

Figure 6:
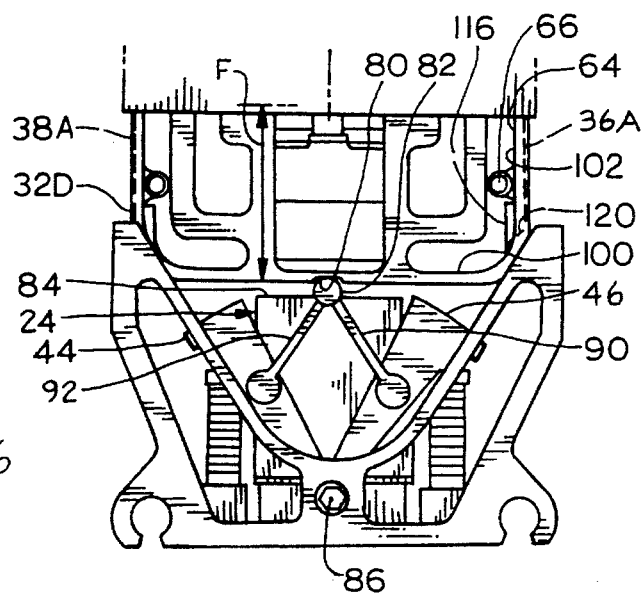

FIG. 6 is a view similar to that of FIG. 5, during a later stage of connection.

Figure 7:
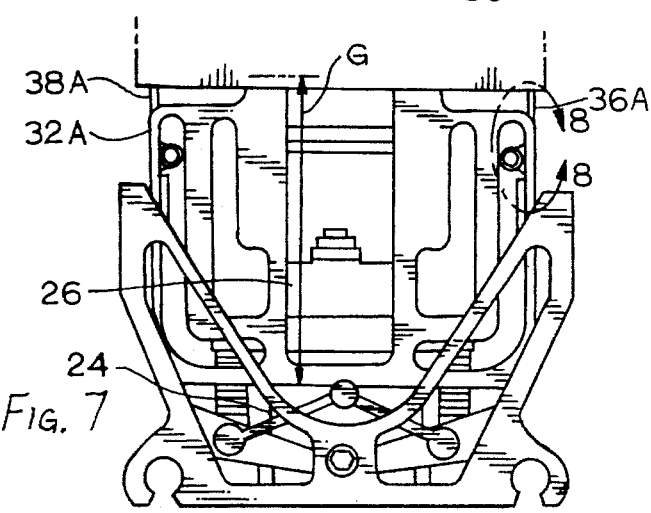

FIG. 7 is a view similar to that of FIG. 6, at the final and complete stage of connection.

Figure 8:
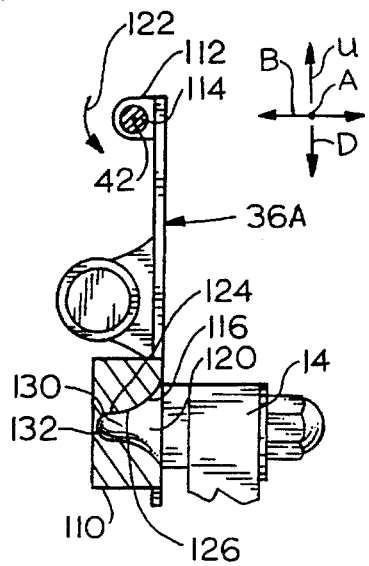

FIG. 8 is a partial sectional view of the region 8—8 of FIG. 7.

Figure 9:
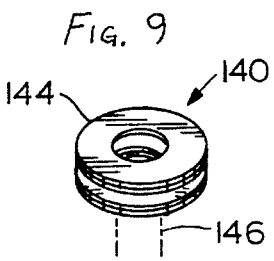

FIG. 9 is a partial isometric view of a stack of Belleville washers of the apparatus of FIG. 5.

DESCRIPTION OF THE PREFERRED EMBODIMENT

FIG. 1 illustrates a connecting apparatus 10 of the present invention, which includes a mounting structure or housing 12 with lower and upper housing parts 14, 16 and a connecting structure 18 that connects the housing parts. In an outer space environment, the housing parts may lie on separate space structures or vehicles which are brought into proximity before mating. The lower and upper housing parts are portions of lower and upper units 20, 22 that each includes a corresponding connector 24, 26 at the ends of cables 27, 28. When a motor module 30 is energized, it moves down a carrier 32 on which the upper connector 26 is mounted, to move down the upper connector until it mates with the lower one.

During downward movement of the carrier 32, a pair of movable members 36, 38 pivot down, out of the way of the carrier 32 and upper connector 26. The members 36, 38, which pivot about axes 40, 42, serve as shields or shield doors that initially protect the bottom of the upper housing 16 and the upper connector 26. As will be discussed later, the members 36, 38 also serve as force-transmitting members that transmit mating and unmating reaction forces. The lower unit 20 includes a pair of shield parts 44, 46 that protect the lower connector 24 prior to mating.

FIG. 1 includes vertically extending arrows U, D that extend in up and down mating directions, arrow A that extends in lateral directions, and arrow B that extends in longitudinal directions. The pivot axes 40, 42 of the pivoting members 36, 38 extend in the longitudinal directions B. It should be noted that while applicant uses terms such as "up", "down", "horizontal", etc. to aid in understanding the invention as it is illustrated, it should be understood that the apparatus can be used in any orientation with respect to gravity.

FIG. 2 illustrates some details of the upper unit 22, which includes the carrier 32 and the upper connector 26 which is mounted on the carrier. The upper housing 16 has opposite sides 50, 52 that are laterally spaced in directions A, and opposite ends 54, 56 that are longitudinally spaced along the directions B. The carrier 32 has a pair of plate-like portions 60, 62 that each lie substantially in a plane that is normal to the axes 40, 42. Each plate-like portion has a slot such as 64. Each pivotable member 36, 38 carries a cam follower 66 which is received in the slot. When the carrier 32 moves downwardly, the cam followers 66 force the movable members from their initial closed positions shown in solid lines in FIG. 2, to down or open positions shown in phantom lines at 36A, 38A. The carrier is moved down by turning a pair of screws 70, 72 which are threadably coupled to nuts on the carrier.

FIGS. 5–7 show the apparatus during three stages in its operation between the initial unmated position of FIG. 1, and the fully mated position of FIG. 7. FIG. 5 shows the carrier at 32B after it has moved a small distance C downwardly from its initial position. During such downward movement by the distance C, the cam followers 66 that are mounted on the pivoting members at 36B, 38B, move along the carrier slots 64 and cause the pivoting members to pivot partially downwardly. Further downward movement of the carrier by the distance E causes the pivoting members to pivot further to the positions 36C, 38C.

FIG. 6 shows the apparatus with the carrier having moved down by the distance F to the position 32D. During movement between the distances E of FIG. 5 and F of FIG. 6, a pusher or location 80, engages a follower member 82 of the lower unit 20. The pusher 80 moves down the follower member 82 and causes pivoting apart of the shield parts 44, 46, to expose the upper or mating end 84 of the lower connector 24. Each of the shield parts 44, 46 is pivotally mounted about a longitudinally-extending lower shield axis 86. The follower member 82 is connected by links 90, 92 to the shield parts 44, 46. The lower end of each link 90, 92 is pivotally connected to a corresponding shield part, and the upper ends of the links are pivotally connected (although the follower member 82 can be fixed to one of the links). As the follower member 82 moves down, the shield parts :44, 46 pivot further apart, until they reach the positions shown in FIG. 7.

FIG. 7 shows the apparatus in the fully mated position, wherein the carrier at 32A has moved down by the distance G from its initial position. The lower and upper connectors 24, 26 are fully mated. The movable members at 36A, 38A will have already been moved to their final position wherein they extend vertically. In fact, the members reach their final positions 36A, 38A just prior to the intermediate position of FIG. 6, which is prior to mating of the connectors.

As shown in FIG. 6, each slot 64 has a horizontal lower portion 100 and a vertical upper portion 102. When the cam follower 66 lies in the horizontal portion 100 as shown in FIG. 5, downward movement of the carrier causes pivoting of the movable members 36, 38. -However, when the cam follower 66 lies in the vertical slot portion 102, any downward movement of the carrier does not cause any pivoting of the members 36, 38. The parts are constructed so that the members 36, 38 reach their vertical positions shown in FIGS. 6 and 7 prior to actual mating,! or physical contact, of the connectors. It would be possible to merely position opposite longitudinally-spaced ends of the movable members in the path of the descending carrier, but this would result in more rapid pivoting, requiring more power to pivot the members.

When the pivoting members reach their final positions such as shown at 36A in FIG. 8, they extend vertically. The pivoting member in the final or down position 36A, has a lower end at 110 which lies directly below its upper end at 112. The upper end is pivotally mounted on a shaft 114 about the axis 42. The lower end 110 forms a plurality of force-transmitting socket elements 116. The lower housing part 14 includes a plurality of force-transmitting pin elements 120 that are ! each positioned so that as a pivoting member such as 36A pivots in the direction 122 to its downward position, the pin element or pin 120 is received in a corresponding socket element or socket 116. The terms "pin" and "socket" should be understood to include two parts that can be moved apart and together, and when together they lie adjacent and can transmit forces in a plurality of directions between themselves. Applicant prefers to taper each pin and socket to guide them into engagement. When a pin and socket are engaged as shown, they have abutting locations such as 124, 126 which face at least partially in the mating directions U, D so mating and unmating forces can be transmitted through; the pin and socket elements.

As the upper and lower connectors 24, 26 first engage each other during mating, a considerable-mating force usually must be applied to press them together to the full mating position. In the case of electrical connectors, mating requires the entrance of numerous pin contacts into corresponding socket contacts that are made to resist pin entrance to assure good electrical connections. Also, shells of the two connectors mate, and there is typically a slight interference fit between them to assure that both shells are grounded. Furthermore, force may be required to shift and tilt one connector with respect to the other to mate them. Comparable, though usually somewhat greater mating forces may be required in the mating of fluid connectors, and comparable forces must be applied in the unmating of electrical or fluid connectors. If the mating reaction forces had to be transmitted through the connecting structure 18 shown in FIG. 1, and that structure 18 had to keep the upper and lower housing parts substantially aligned, then the structure 18 would have to be rigid, which would require a large and heavy connecting structure. In the case of space vehicles that lie in proximity, the momentum of the vehicles is considered to be the "connecting structure" that keeps the housing parts in gross alignment until the movable members couple the housing parts. Applicant avoids the need for a rigid connecting structure (or small rockets to supplement momentum) by relying upon the pivoting members such as 36A in FIG. 8, to transmit mating and unmating reaction forces between the upper and lower housing parts and to assure gross alignment of the housing parts prior to the mating of the connectors.

The movable members such as 36A initially align the housing parts as the sockets 116 engage the pins 120, which occurs prior to the connectors closely approaching each other. Considerable force can be applied to the movable members to pivot them to their down positions, and the tapered pins and sockets can cause slight shifting of the housing parts relative to each other as the pins and sockets engage each other. Longitudinally-facing locations such as 130 on the pins provide gross alignment in a longitudinal direction, while laterally-facing locations such as 132 on the pins provide gross alignment in a lateral direction B. As mentioned earlier, locations such as 124, 126 transmit mating and unmating reaction forces.

While the upper connector 26 is fixed to the carrier 32, and the carrier is fixed against lateral and longitudinal movement with respect to the upper housing part, the lower connector 24 is mounted so it can shift position and orientation. As shown in FIG. 1, the lower connector 24 is mounted on a flange member 140. The flange member is supported by four resiliently deflectable supports 142 that each comprises a stack of Belleville washers. Fig. 9 shows a portion of one of such stacks, which includes numerous conically deformed washers 144, with every other washer having its middle upwardly bowed and the in between washers having their middles downwardly bowed. The stack of Belleville washers is compressed by bolts 146 (FIG. 1) that also aligned them. The Belleville washers permit slight sideward shifting and tilting of the lower connector to enable mating of the connectors.

FIG. 4 shows some details of the mechanism for moving the carrier 32. Each lead screw 70, 72 is rotatably mounted by a pair of bearings 150, 152 on the upper housing part 16. Each plate-like portion such as 60 of the carrier has a nut 154 which is: threadably engaged with a corresponding lead screw. The motor module 30, i or motor is connected through a gear box with gears such as 156 to the screws to turn them. A limit switch 170 engages a location on the carrier (not shown) to stop energization of the motor when the carrier has moved a predetermined distance which assures full mating of the connectors.

Applicant has constructed and tested a connecting apparatus of the general construction shown in FIG. 1, with the upper housing having a height H of 10.1 inches and with the other parts being in proportion as illustrated in that figure. The connectors were able to mate despite a lateral or longitudinal misalignment of plus or minus 0.25 inch, and despite an angular misalignment of up to 2°. The particular apparatus was constructed for use in a spacecraft application.

Thus, the invention provides a connecting apparatus or umbilical mechanism which can automatically mate and unmate a pair of connectors. The apparatus includes upper and lower housing parts and a connecting structure that holds them in approximate desired positions, with the upper connector mounted on a carrier that can be moved down by a motor to mate the upper connector to the lower: one. A pair of movable members pivotally mounted on the upper housing part, pivot down to engage the lower housing part prior to mating of the connectors, so that mating forces can be transmitted through the pivoting members, instead of requiring the connecting structure to transmit such forces. Pin and socket elements on the pivoting members and on the lower housing part engage each other to transmit forces as well as provide moderate alignment of the connectors. The pivoting members can serve as shields to protect the upper connector when it is in the fully unmated position. A lower shield can protect the lower connector, and can include a pair of shield parts that are pivotally mounted on the lower housing and that are moved by a follower member that is activated by the descending carrier.

Although particular embodiments of the invention have been described and illustrated herein, it is recognized that modifications and variations may readily occur to those skilled in the art, and consequently, it is intended that the claims be interpreted to cover such modifications and equivalents. Although the claims refer to "upper", "lower", etc., this refers only to the relative positions of the parts, and they can be used in any orientation with respect to gravity.

We claim:

1. Apparatus for automatically mating a pair of connectors, comprising:

a housing that includes lower and upper housing parts and a connecting structure that connects said housing parts, and lower and upper connectors coupled to corresponding ones of said housing parts, said lower and upper connectors having corresponding mating ends facing in largely vertical mating directions toward each other at least in an initial position of said apparatus;

a motor device;

a carrier mounted on said upper housing part, said motor device being coupled to said carrier to move said carrier largely vertically toward and away from said first housing part between an initial position and a fully mated position, with said upper connector coupled to said carrier to move substantially with said carrier;

a plurality of force-transmitting pin and socket elements mounted on said housing parts, with said elements arranged in engagable pairs, with the different elements of each pair coupled to different ones of said housing parts;

at least one movable member which is movably mounted on said upper housing part and which is coupled to said carrier, with one element of each of a plurality of said pairs mounted on said movable member, said at least one movable member being movable between an initial position wherein the elements of said pairs lie away from each other when said carrier is in said initial position, and a second position wherein the elements of said pairs of elements engage one another, with said movable member reaching said second position prior to said carrier reaching said fully mated position, with said pin and socket elements being spaced about said connectors, and with each pair of engaged elements having abutting locations facing at least partially in said mating and unmating directions to transfer at least some mating reaction forces through said at least one movable member between said first and second housing parts.

2. The apparatus described in claim 1 wherein:

said at least one movable member is pivotably mounted about a first axis extending substantially perpendicular to said mating directions, on said upper housing part, and said member has a cam follower;

said carrier has a largely plate-like portion lying substantially in a vertical plane, said plate-like portion having a slot that closely receives said cam follower, with said slot including a largely horizontal lower portion which moves said follower to pivot said member as said carrier first moves down, and said slot includes a vertical portion which avoids movement of said member as said carrier continues to move down.

3. The apparatus described in claim 1 wherein:

said upper housing part has longitudinally-spaced opposite ends and laterally spaced opposite sides;

said at least one movable member includes first and second members that are each pivotably mounted about a longitudinally extending axis lying at a different one of said sides to pivot from said initial position wherein said members each lie under a portion of said connector and said second position, and a pair of cam followers attached to each of said members;

said carrier includes a pair of plate-like carrier portions at said opposite ends of said upper housing part, each carrier portion having a pair of slots wherein each slot has a substantially horizontal lower portion and a substantially vertical portion extending from an end of a corresponding one of said horizontal portions, said cam followers each being slidably received in a corresponding one of said slots;

said carrier has a pair of threaded nuts each coupled to one of said carrier portions, and said motor device includes a pair of vertically extending screws rotatably mounted on said upper housing part at the middle of said opposite ends, each screw being threadably engaged with one of said nuts.

4. The apparatus described in claim 1 including:

apparatus which deflectably supports said lower connector on said lower housing part, including a flange member fixed to said first connector and a plurality of stacks of Belleville washers, each stack extending substantially vertically and supporting a location of said flange member on said lower housing part.

5. Apparatus for automatically connecting a pair of connectors, comprising:

a housing that includes first and second housing parts and a connecting structure that connects said housing parts;

first and second connectors coupled to corresponding ones of said housing parts, said first and second connectors having corresponding mating ends facing in mating directions toward each other at least in an initial position of said apparatus;

a motor device;

a carrier mounted on said second housing part, said motor device being coupled to said carrier to move said carrier toward and away from said first housing part between an initial position and a fully mated position, with said second connector coupled to said carrier to move substantially with said carrier;

a first shield which includes at least a first shield part that is pivotably mounted on said first housing part and that is pivotable between a closed position wherein said first shield part lies over said first connector mating end and an open position wherein said first shield part lies away from said first connector mating end; and a follower member that is movable at least partially along said mating directions and which is coupled to said first shield to pivot it;

said carrier including a pusher that is positioned to engage said follower member and move it to pivot said first shield part to said open position, to expose said first connector end for mating thereto.

6. The apparatus described in claim 5 wherein:

said first shield includes a second shield part that is pivotably mounted on said first housing part;

a pair of links, each having one end connected to said follower member and an opposite end pivotably connected to a different one of said shield parts, with said links angled in different directions from a vertical direction when said mating directions are vertical, to pivot said first and second shield parts in opposite directions as said follower member moves substantially vertically.

7. Apparatus for connecting lower and upper connectors that respectively lie in lower and upper housing parts of a housing, where the upper connector is mounted on a carrier that is movable downwardly by a motor, and where the upper housing part has a bottom and has laterally-spaced opposite sides and longitudinally spaced opposite ends, characterized by:

a pair of shield doors that have inner ends pivotably mounted at opposite sides of said upper housing part at the bottom thereof about longitudinally-extending axes, and that have outer ends, said doors being pivotable from horizontal to vertical positions, with said outer ends lying below said inner ends in said vertical position;

said carrier has largely plate-like portions lying substantially in vertical planes extending normal to said longitudinally extending axes and lying at said opposite ends of said upper housing, said plate-like portions each having slots with primarily horizontal lower slot parts and primarily vertical slot parts;

a plurality of cam followers, each attached to one of said shield doors and each being movable along one of said slots of said carrier plate-like portions to pivot a corresponding shield door from said horizontal position to said vertical position as said carrier moves down.

8. The apparatus described in claim 7 wherein:

said shield doors and said lower housing part each has a plurality of force-transmitting elements that are arranged in pairs, with one element of a pair mounted on a door and the other mounted on said lower housing part, and with one element of each pair being a socket with walls lying closely below and above the other element when the pair of elements are engaged;

said force transmitting elements on said lower housing part being positioned to engage corresponding elements on said doors when said doors move to said vertical positions, and said door each being pivotably mounted directly on said upper housing part.

9. A method for mating lower and upper connectors that are spaced along a vertical axis and that are mounted on corresponding lower and upper housing parts, where said housing parts are connected by a connecting structure, and where said upper connector is mounted on a carrier that moves downwardly to mate while said lower connector remains substantially stationary, comprising:

pivoting inner ends of each of a pair of movable members on said upper housing about a pair of parallel horizontal axes that are located at the bottom of said upper housing part as said carrier moves down, so that outer ends of said movable members move toward down positions under corresponding ones of said axes;

positioning pairs of mating pin and socket elements so one element of a pair is on the outer end of one of said movable members and mates with the other element of the pair which is mounted on said lower housing part, as said movable members reach said down positions, with said pairs of elements constructed to have at least partially vertically facing abutting surfaces, to resist relative vertical movement of said housing parts by forces transmitted between said upper and lower housing through said movable members.

10. The method described in claim 9 wherein:

said step of pivoting said movable members includes forcing cam followers fixed to said movable members and engaged with camming surfaces on said carrier, to pivot said movable members to said down positions as said carrier moves down.

\* \* \* \* \*